United States Patent [19]

Agrawal et al.

[11] Patent Number: 5,881,223
[45] Date of Patent: Mar. 9, 1999

[54] CENTRALIZED PERFORMANCE MONITORING ARCHITECTURE

[75] Inventors: Sumeet Agrawal, Aloha, Oreg.;
 Andrew F. Glew, Madison, Wis.;
 Patrick G. Franklin, Kent, Wash.;
 Reed Spotten, College Park, Md.

[73] Assignee: Intel Corporation, Santa Clara, Calif.

[21] Appl. No.: 708,940

[22] Filed: Sep. 6, 1996

[51] Int. Cl.[6] .................................................. G06F 13/00
[52] U.S. Cl. ............................. 395/184.01; 395/185.01; 395/183.22; 371/5.1
[58] Field of Search ..................... 395/184.01, 183.06, 395/183.22, 183.15, 185.01; 371/5.1, 22.5, 22.6, 5.2

[56] References Cited

U.S. PATENT DOCUMENTS

| | | | |
|---|---|---|---|
| 4,101,964 | 7/1978 | Betts ........................................ | 364/724 |
| 4,389,538 | 6/1983 | White ....................................... | 179/1 |
| 4,881,191 | 11/1989 | Morton .................................... | 364/724 |
| 4,931,972 | 6/1990 | Obata et al. ........................ | 364/724.13 |
| 5,537,541 | 7/1996 | Wibecan ............................. | 395/183.21 |
| 5,557,548 | 9/1996 | Grover et al. ...................... | 364/551.01 |
| 5,657,253 | 8/1997 | Dreyer et al. ...................... | 364/555.01 |

OTHER PUBLICATIONS

Brantley, W.C. et al, "RP3 Performance Monitoring Hardware," Parallel Computing Sys., ALM Press, NY, pp. 186–198, 1989.

*Primary Examiner*—Robert W. Beausoliel, Jr.
*Assistant Examiner*—Norman M. Wright
*Attorney, Agent, or Firm*—Blakely, Sokoloff, Taylor & Zafman LLP

[57] ABSTRACT

A dynamically configurable arrangement for determining performance of a microprocessor. A plurality of functional units in a microprocessor are coupled to a performance counter, wherein the performance counter is incremented in response to occurrence of a predetermined event. A plurality of repeaters coupled between the plurality of functional units and the performance counter. Control circuitry coupled to the plurality of repeaters, wherein the control circuitry selectively enables the repeaters such that only one functional unit is coupled to the performance counter at a particular time.

10 Claims, 4 Drawing Sheets

CENTRALIZED PERFORMANCE MONITORING ARCHITECTURE

The present application is related to the following co-pending U.S. patent application, Ser. No. 08/708,929 entitled "APPARATUS AND METHOD FOR FILTERING EVENT SIGNALS", filed Sep. 6, 1996, and assigned to the assignee of the present invention.

FIELD OF THE INVENTION

The present invention relates to the field of microprocessor design; more particularly, the present invention relates to a method and apparatus for dynamically configurable centralized performance monitoring.

BACKGROUND OF THE INVENTION

Microprocessor designers, system designers and system software designers often count the number of times a particular event occurs in a microprocessor to gage the performance of the microprocessor being designed. Performance counters are typically used for this purpose. Each time a particular event occurs, the associated performance counter is incremented. The performance counters are typically built into the circuits being monitored.

After the microprocessor has performed some or all of its tasks, the performance counters are read to determine the number of times a particular event occurred. For example, if the average number of instructions issued per clock cycle is of interest, a performance counter that counts the number of clock cycles and another performance counter that counts the number of instructions issued could be read. By reading the values in the performance counters, the designer can gain a better understanding of how efficiently microprocessor resources are used.

However, performance counters require dedicated hardware for each event that may be counted. Because microprocessors are typically not redesigned and fabricated prior to each test a performance counter must be available for every event that may be counted. However, some events may never be of interest to designers or may be examined only rarely. Thus, resources are consumed by performance monitoring that may be rarely or never used, leading to a waste of microprocessor resources, which are often scarce. It would be desirable to avoid having to have dedicated performance monitoring circuitry for events that may be of little or no interest.

The present invention provides a dynamically configurable centralized performance monitoring architecture that counts events that occur in various distributed circuits of a microprocessor without having to incorporate performance counters for each of these circuits.

SUMMARY OF THE INVENTION

A dynamically configurable performance monitoring architecture is described. A performance counter, a plurality of functional units and a control unit are configured to selectively couple one of the functional units to the performance counter to count the number of occurrences of a particular event.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A dynamically configurable centralized performance monitoring architecture is described. In the following description, numerous details are set forth, such as particular bit patterns, functional units, number of counters, etc. It will be apparent, however, to one skilled in the art, that the present invention may be practiced without these specific details. In other instances, well-known structures and devices are shown in block diagram form, rather than in detail, in order to avoid obscuring the present invention.

In the present invention, multiple performance counters are fabricated on an integrated circuit (IC) die at a location apart from the circuits to be monitored. The performance counters may be incrementors or registers. Each performance counter may be coupled to individual functional units dynamically, via one or more performance buses. As described herein, a functional unit is a portion of an integrated circuit (IC) which has a designated function.

Control and filter logic implement a bus protocol on the performance buses to control when a performance counter monitors a particular event of interest at a given time. The functional unit to be monitored may be on the same IC die as the performance counters, or may be on a different IC die.

Figure 1:
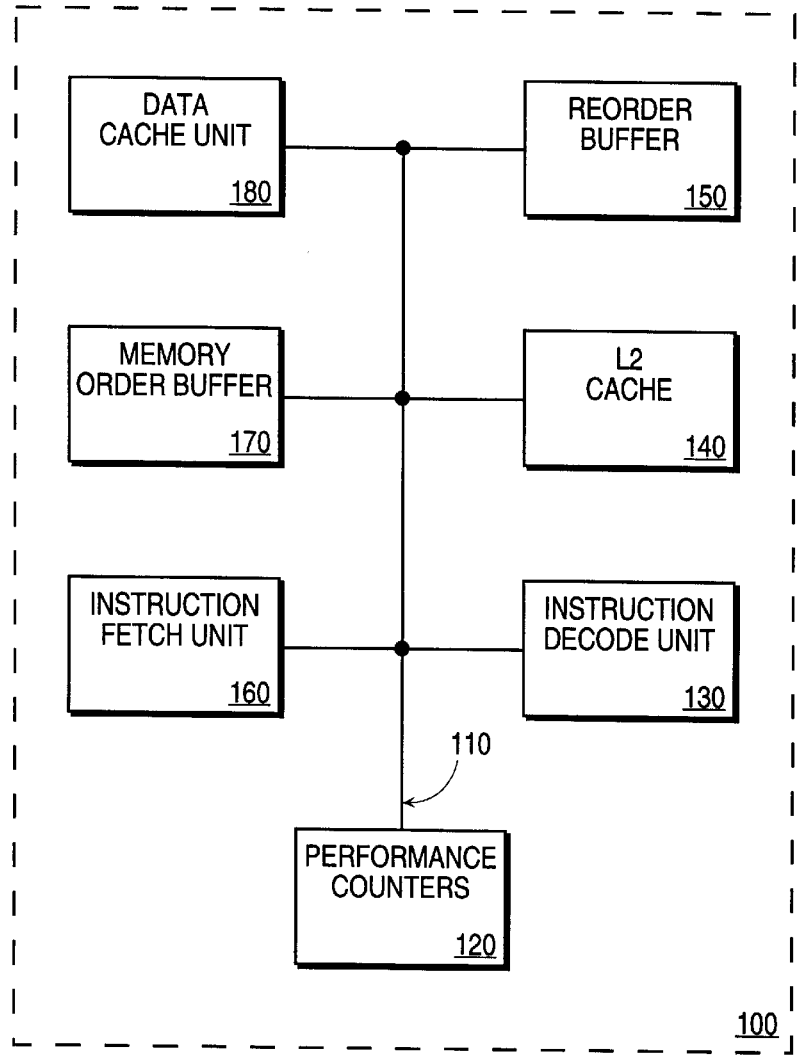
FIG. 1 is a block diagram of one embodiment of a microprocessor containing centralized performance counters.

FIG. 1 is a block diagram of one embodiment of a centralized performance monitoring architecture in a microprocessor according to the present invention. Referring to FIG. 1, performance counters 120 are coupled to various functional units by performance buses 110. The functional units coupled to performance buses 110 may be any functional unit in a microprocessor 100 such as instruction decode unit 130, second level (L2) cache memory 140 (which may be located on a different IC die), reorder buffer 150, instruction fetch unit 160, memory order buffer 170, data cache unit 180, or a clock generation unit (not shown). Functional units in addition to those listed may also be coupled to performance buses 110, such as execution units. According to one embodiment, the performance counters 120 comprise two performance counters; however, any number of performance counters may be used (e.g., 3, 4, etc.), as will be described in greater detail below.

Each performance counter may be configured to be selectively coupled to each functional unit by a dedicated bus; however, alternative architectures may also be used. For example, one performance counter may be coupled to the processor clock while one or more performance counters are selectively coupled to the functional units. Alternatively, one performance counter may be selectively coupled to one of a first set of functional units while another performance counter is selectively coupled to one of a second set of functional units. Also, one performance counter may be coupled to one functional unit, while another is selectively coupled to one of a plurality of functional units.

Figure 2:
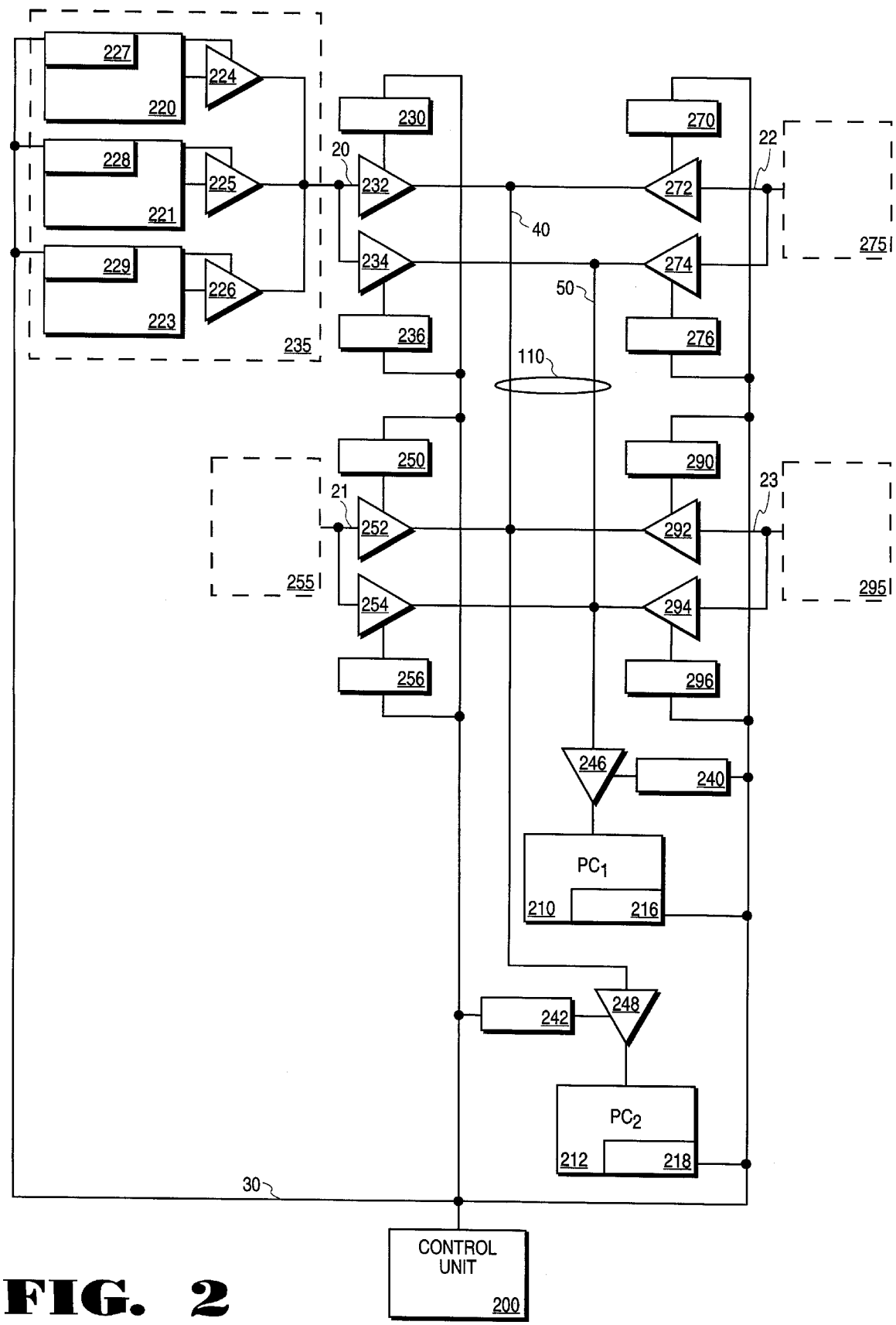
FIG. 2 is a diagram of functional units and centralized performance counters in a microprocessor according to one embodiment of the present invention.

FIG. 2 is a block diagram of one embodiment of a centralized performance monitoring architecture including control circuitries. A processor or other IC comprises a plurality of segments, such as segments 235, 255, 275 and 295. Each segment comprises one or more functional units, such as functional units 220, 221 and 223 in segment 235.

The functional units that are included in the performance monitoring architecture have a filter register and a driver associated with them. For example, functional unit 220 comprises filter register 227 and is coupled to driver 224. The filter registers associated with the functional units are coupled to control unit 200 via control bus 30. The functional unit, driver and filter register are configured to drive an intermediate bus, such as intermediate bus 20, at appropriate times in response to control signals from control unit 200.

According to one embodiment, each segment is coupled to a central performance bus, such as performance bus 40 or performance bus 50 via an intermediate bus and a repeater coupled to a control register. For example, functional units 220, 221 and 223 are coupled to intermediate bus 20 via drivers 224, 225 and 226, respectively. Intermediate bus 20 is coupled to performance bus 40 and performance bus 50 via repeaters 232 and 234, respectively. Repeater 232 is coupled to control register 230 and repeater 234 is coupled to control register 236. Both control register 230 and control register 236 are coupled to control unit 200 via control bus 30 to enable the respective repeaters at the appropriate times.

Repeaters 232 and 234 are enabled by control registers 230 and 236 respectively such that intermediate bus 20 drives performance bus 40, performance bus 50, or neither performance bus. Segments 255, 275 and 295 are coupled to performance bus 40 and performance bus 50 in a similar manner. The functional units, associated drivers and repeaters are coupled to the performance buses such that only one functional unit drives each performance bus at a given time. The functional unit configured to drive the performance buses is dynamically configurable.

For example, the functional units of segment 255 (not shown) are coupled to intermediate bus 21 as discussed above with respect to segment 235. Intermediate bus 21 is coupled to the drivers of the functional units and to repeaters 252 and 254, which are coupled to performance bus 40 and performance bus 50, respectively. The functional units of segment 275 (not shown) are coupled in a similar manner to intermediate bus 22, which is coupled to performance bus 40 and performance bus 50 via repeaters 272 and 275, respectively. The functional units of segment 295 (not shown) are coupled in a similar manner to intermediate bus 23, which is coupled to performance bus 40 and performance bus 50 via repeater 292 and 294, respectively. Repeaters 232, 252, 272 and 292 are controlled by control registers 230, 250, 270 and 290, such that one repeater is enabled at a particular time. Control registers 230, 250, 270 and 290, respectively, are coupled to control unit 200 via control bus 30. Performance bus 50 is selectively coupled to segments in a similar manner.

According to one embodiment, each performance bus has an additional repeater coupled between the repeaters discussed above and the performance counter. Each additional repeater is also coupled to a control register, which is coupled to control unit 200 via control bus 30 to selectively enable the repeater. For example, repeater 248 is coupled to repeaters 232, 252, 272 and 292 via performance bus 40. Repeater 248 is coupled to performance counter 212 and to control register 242. Control register is coupled to control unit 200 via control bus 30 to selectively enable repeater 248 at appropriate times.

It should be noted that the repeaters described above are not necessary to practice the present invention. Repeaters are used to boost signals that degrade as the signal travels along a bus or other line. Repeaters may also be used to meet frequency requirements. Thus, the use and placement of repeaters is determined by the physical characteristics of the circuit in which the performance monitoring architecture is implemented.

Performance counters 210 and 212, which are coupled to repeaters 246 and 248 respectively, include selection registers. Performance counter 210 includes selection register 216 and performance counter 212 includes selection register 218, which are coupled to control unit 200 via control bus 30. Note that although only two performance counters are shown, more performance counters may be implemented.

Control unit 200 generates control words that are decoded by the registers and circuits coupled to control unit 200. Control words are described in greater detail below with respect to FIG. 3.

To configure the performance monitoring architecture, control unit 200 outputs a control word that is received and decoded by the circuit elements coupled to control unit 200. Selection registers, such as selection registers 216 and 218, decode a control word to determine which events are counted by performance counters 210 and 212, respectively. Filter registers, such as filter registers 227, 228 and 229, decode the control word to determine which events should be signaled to associated intermediate buses, such as intermediate bus 20. Control registers, such as control registers 230, 236, 250, 256, 270, 276, 290 and 296, decode a control word and selectively couple via repeaters the appropriate intermediate buses to the appropriate performance buses. Thus, selected events are counted by the performance monitoring architecture by selectively coupling the functional unit in which the event occurs to a performance counter dynamically.

Figure 3:
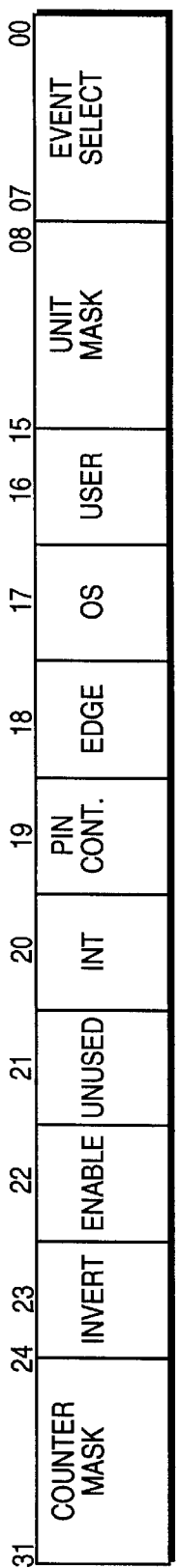
FIG. 3 is the layout of a control word according to one embodiment of the present invention.

FIG. 3 is one embodiment of the control word generated by control unit 200. Bits 00 through 07 comprise event select bits that select the event to be monitored. Event select bits 00–07 define both the functional unit and the event within the functional unit to be monitored.

Bits 08–15 comprise unit mask bits, which are used to select a subset of the information selected by event select bits 01–07. These are used as filters in the functional units.

Bits 16 and 17 are user and operating system (OS) bits, respectively. Bits 16 and 17 permit distinctions to be made between operating system and user applications. If both bits 16 and 17 are set, each occurrence of a particular event is counted. If operating system bit 17 is set and user bit 16 is not set, only operating system users have the privilege to count events.

If operating system bit 17 is not set and user bit 16 is set, only user applications can count events.

Edge detect bit 18 indicates whether edge transitions or logical levels are counted as events. Bits 19 and 20 are pin control and interrupt bits, respectively. Pin control bit 19 enables certain outputs to be output to pins of the processor directly. Interrupt bit 20 enables an interrupt upon overflow of a counter while counting a particular event. Bit 21 is reserved for later use in one embodiment. Enable bit 22 indicates whether performance counters 210 and 212 are enabled or disabled.

Bit 23 is the invert bit that is used in conjunction with bits 24–31 to allow both greater than and less than comparisons can be made. Bits 24 through 31 are counter mask bits, which are used to select the number of events that must occur before a performance counter is incremented. For example, if the counter mask bits equal 0, then the performance counter is incremented each time the selected event occurs. If the counter mask bits equal 3, the performance counter is incremented only if three or more of the selected events occur.

The control, selection and filter registers may not receive or store the full control word of FIG. 3. Each register may be configured to receive only the bits relevant to the functionality associated with the register. For example, control registers 230 and 236, which enable repeaters 232 and 234, respectively, may not receive counter mask bits 26–31 of the control word of FIG. 3 because repeaters 232 and 234 do not affect the manner in which an event is to be counted. The function of repeaters 232 and 234 is to couple a functional unit to a performance bus at the appropriate times.

By way of example, to determine the number of cache misses in a data cache unit per cycle according to one embodiment of the present invention, one performance counter is configured to count cache misses and another performance counter is configured to count clock cycles. In the following example, performance counter 210 counts cache misses in a cache memory unit (not shown) in segment 255 and performance counter 212 counts clock cycles in a clock generation unit (not shown) in segment 295.

Event select bits 00–07 of a first control word that configure the performance monitoring architecture to count cache misses are generated to indicate to the functional units that cache misses are to be counted. Each functional unit decodes event select bits 00–07 to determine whether that functional unit performs the function to be counted. Because data cache unit 180 determines hits and misses in the cache, data cache unit 180 outputs a signal in response to each cache miss to repeater 254, while the other functional units do not generate outputs to performance bus 50.

Unit mask bits 08–15 cause control register 256 to enable repeater 254 such that data cache unit 180 drives performance bus 50. Bits 16 and 17 are decoded by performance counter 210 to determine which cache misses (user applications versus OS requests) are to be counted, as described above with reference to FIG. 3. Edge bit 18 is decoded to determine whether the transition of a signal or the level of a signal is counted as an event by data cache unit 180.

Bits 19 and 20 are decoded to determine whether an external interrupt is generated. Enable bit 22 is decoded by selection register 216 to determine whether performance counters 210 and 212 are enabled. Invert bit 23 is decoded in association with counter mask bits 24–31 to be discussed in greater detail below. Counter mask bits 24–31 are decoded to determine whether one or more events are required to increment performance counter 210. To count the number of cache misses per clock cycle, counter mask bits 24–31 are cleared so that any time a cache miss occurs, performance counter 210 is incremented.

A second control word is generated by control unit 200 to configure the performance monitoring architecture to count clock cycles. Event select bits 00–07 are configured to indicate that clock cycles are to be counted by clock generation unit 190. Filter register 284 decodes event select bits 00–07 to indicate to clock generation unit 190 that clock cycles are to be counted. Unit mask bits 08–15 are decoded by control register 296 to enable repeater 294. Bits 16–23 are decoded as discussed above. Counter mask bits 24–31 are set to zero, so that each clock cycle is counted by performance counter 212.

To count multiple instructions per cycle, the performance monitoring architecture is configured such that performance counter 210 is incremented each time multiple instructions are issued and performance counter 212 is incremented on every clock cycle. Performance counter 212 is configured as above to count clock cycles.

The control word to configure performance counter 210 is generated in a manner similar to the other control words, except that counter mask bits 24–31 are set to equal 1 so that performance counter 210 is incremented only when more than one instruction is issued.

Figure 4:
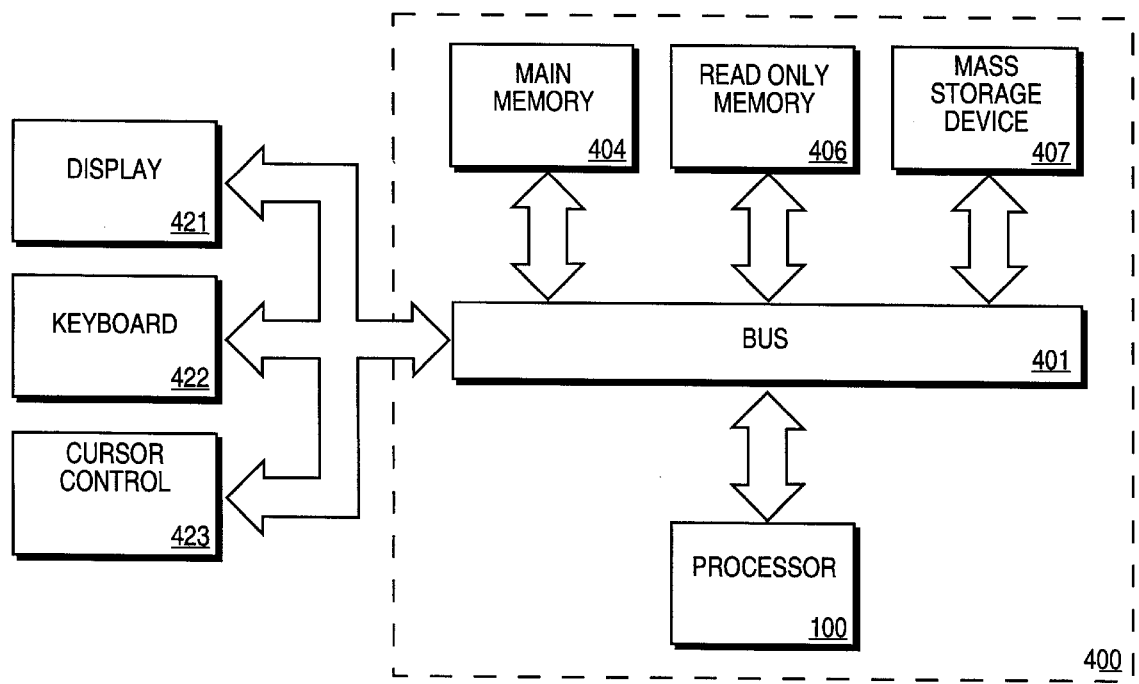
FIG. 4 is a computer system upon which the present invention may be implemented.

FIG. 4 is a block diagram of a computer system in which a microprocessor with a centralized performance monitoring architecture may be used. Computer system 400 comprises a bus 401 or other communication means for communicating information, and a processor 100 coupled with bus 401 for processing information. Computer system 400 further comprises a random access memory (RAM) or other dynamic storage device 404, coupled to bus 401 for storing information and instructions to be used by processor 100. Computer system 400 also comprises a read only memory (ROM) and/or other static storage device 406 coupled to bus 401 for storing static information and instructions for processor 100. Data storage device 407 is coupled to bus 401 for storing information and instructions.

A data storage device 407 such as a magnetic disk or optical disc and its corresponding drive may be coupled to computer system 400.

Computer system 400 may also be coupled via bus 401 to a display device 421, such as a cathode ray tube (CRT) or liquid crystal display (LCD), for displaying information to a computer user. An alphanumeric input device 422 such as a keyboard is typically coupled to bus 401 for communicating information and command selections to processor 100. Another type of user input device is cursor control 423, such as a mouse, trackball, trackpad, stylus, or cursor direction keys for communicating direction information and command selections to processor 100 and for controlling cursor movement on display 421.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a centralized performance monitoring architecture has been described.

What is claimed is:

1. A dynamically configurable architecture for monitoring
   a first performance counter;
   a first performance bus coupled to the first performance counter;
   a second performance counter;
   a second performance bus coupled to the second performance counter;
   a plurality of functional units coupled to the first performance bus and to the second performance bus;
   a control unit coupled to buffer and filter circuitry in the plurality of functional units, to the first performance counter and to the second performance counter, wherein the control circuitry is to selectively couple one of the plurality of functional units to the first performance counter via the first performance bus to count a number of occurrences of a first designated event, and further wherein the control circuitry is to selectively couple a second of the plurality of functional units to the second performance counter via the second performance bus to count a number of occurrences of a second designated event.

2. The dynamically configurable architecture of claim 1, wherein the control unit generates control signals that indicate to the first and second performance counters and the plurality of buffer and filter circuitry of the functional units the particular event.

3. The dynamically configurable architecture of claim 2, further comprising:

a driver having an input coupled to said one of the plurality of functional units and an output coupled to one of the first performance bus and the second performance bus; and a filter register coupled the control unit to selectively enable the driver in response to at least one of the control signals received from the control unit.

4. The dynamically configurable architecture of claim 2, further comprising a selection register coupled to the control unit and the first performance counter to enable the first performance counter, in response to at least one control signal received from the control unit, to increment in response to signals received from the functional units.

5. A dynamically configurable arrangement for monitoring performance of an integrated circuit, comprising:

a plurality of functional units;

a first performance counter;

a first performance bus coupled to the first performance counter;

a second performance counter;

a second performance bus coupled to the second performance counter;

a plurality of drivers and filter circuits coupled between the plurality of functional units and the first and second performance buses; and control circuitry coupled to the plurality of functional units to selectively enable the plurality of drivers such that the first performance counter is incremented in response to a first designated event for only one functional unit at a particular time and to selectively enable the plurality of drivers such that the second performance counter is incremented in response to a second designated event for only one functional unit at the particular time.

6. The dynamically configurable arrangement of claim 5, wherein the control circuitry comprises:

a control unit;

a plurality of filter registers coupled to the control unit and the plurality of functional units to individually enable functional units to output a signal in response to the the first designated event and the second designated event; and a first selection register coupled to the control unit and the first performance counter to enable the first performance counter, in response to the signals generated by the control unit, to selectively count output signals from the plurality of functional unit; and a second selection register coupled to the control unit and the second performance counter to enable the second performance counter, in response to the signals generated by the control unit, to selectively count output signals from the plurality of functional units.

7. A processor comprising:

a plurality of functional means for performing a designated function;

first counting means for counting first designated events;

second counting means for counting second designated events;

control means for selectively coupling one of the plurality of functional means to the first counting means to increment the first counting means in response to occurrence of the first designated event and for selectively coupling one of the plurality of functional means to the second counting means to increment the second counting means in response to occurrence of the second designated event; and a plurality of filter means for enabling one of the plurality of functional means to output a signal in response to occurrence of the particular event.

8. The processor of claim 7, wherein the control means comprises:

means for generating control signals; and a first selection means for enabling the first counting means to selectively increment in response to occurrence of the first designated event; and a second selection means for enabling the second counting means to selectively increment in response to occurrence of the second designated event.

9. A method for centralized performance monitoring in a processor comprising the steps of:

dynamically and selectively coupling a first performance counter to a first of a plurality of functional units;

dynamically and selectively coupling a second performance counter to a second of a plurality of functional units;

incrementing the first performance counter in response to occurrence of a first designated event in said first of the plurality of functional units coupled to the first performance counter; and incrementing the second performance counter in response to occurrence of a second designated event in a second of the plurality of functional units coupled to the second performance counter.

10. The method of claim 9, wherein the step of coupling the performance counter to one of the plurality of functional units comprises the steps of:

indicating the first designated event to be counted to said first of the plurality of functional units;

indicating the second designated event to be counted to the second of the plurality of functional units;

outputting a first signal to the first performance counter in response to occurrence of the first designated event; and outputting a second signal to the second performance counter in response to occurrence of the second designated event.

* * * * *